United States Patent [19]

Bayne

[11] E Re. 29,892

[45] Reissued Jan. 30, 1979

[54] COMPOSITION AND METHOD OF TREATING DOPAMINE DEFICIENCY IN BRAIN TISSUE

[75] Inventor: Gilbert M. Bayne, Lansdale, Pa.

[73] Assignee: Merck & Co. Inc., Rahway, N.J.

[21] Appl. No.: 790,155

[22] Filed: Apr. 22, 1977

Related U.S. Patent Documents

Reissue of:

[64] Patent No.: 3,769,424
Issued: Oct. 30, 1973
Appl. No.: 77,327
Filed: Oct. 1, 1970

U.S. Applications:

[63] Continuation-in-part of Ser. No. 835,730, Jun. 23, 1969, abandoned, which is a continuation-in-part of Ser. No. 764,325, Oct. 1, 1968, abandoned.

[51] Int. Cl.[2] ..... A61K 31/195
[52] U.S. Cl. ..... 424/319
[58] Field of Search ..... 424/317, 319

[56] References Cited

U.S. PATENT DOCUMENTS

| | | | |
|---|---|---|---|
| 3,322,630 | 5/1967 | Porter | 424/319 |
| 3,462,536 | 8/1969 | Chemerda et al. | 424/309 |
| 3,557,292 | 1/1971 | Bartholini | 424/319 |
| 3,830,827 | 8/1974 | Karady et al. | 260/471 A |

FOREIGN PATENT DOCUMENTS

| | | |
|---|---|---|
| 1173487 | 6/1961 | Fed. Rep. of Germany. |
| 1553M | 12/1962 | France. |
| 940596 | 10/1963 | United Kingdom. |

OTHER PUBLICATIONS

Bartholini et al., Nature, vol. 215, Aug. 19, 1967, pp. 852–853.
Udenfriend et al., Mol. Pharmacol. 2, 95–105, (1966).
Eidelberg et al., Int. J. Neuropharmacol., 1966, 5, 59–74.
Chem. Abst. 58–705H (1963); 59–12921*c* (1963); 65–96006 (1965) and 66–26274*e* (1967).
Chase et al., Neurol., 22 (4), 384, Apr. 1972.
Mars, Arch. Neurol. 28, 93, Feb. 1973.
"Treatment of Parkinsonism – The Role of DOPA Decarboxylase Inhibitors" in Advanced Neurology, 2, pp. 82, 83, 88, 89, 166, 167, 168, 169, 268 & 269, (M. Yahr. ed. (1973).
Porter et al., Biochem. Pharmacol. II, 1067, (1962).
Sletzenger et al., J. Med. Chem. 6, 101, (Mar. 1963).
Ropp et al., Brain Res., 2 (4), 323 (1966).
Cotzias, "L-DOPA in Parkinson's Disease", Hospital Practice, Sep. 1969 at 35.
Cotzias et al., New Eng. J. Med. 280, 337, (Feb. 13, 1969).
Bartholini et al., Helv. Physiol. Acta., 25 CR170, (1967).
Henning, Brit. J. Pharmacol. 34, 233P, Sep. 1968.
Bruinvels et al., European J. Pharmacol., 4, 31 (1968).

*Primary Examiner*—Stanley J. Friedman
*Attorney, Agent, or Firm*—Fitzpatrick, Cella, Harper & Scinto

[57] ABSTRACT

The dopamine content in brain tissue of animals is increased by administering to the animal L-dopa or its salts in combination with L-α-hydrazino-α-lower alkyl-3,4-dihydroxyphenyl propionic acid or its salts [or α-hydrazino-3,4-dihydroxyphenyl propionic acid or its salts]. The increased dopamine content in brain tissue tends to alleviate some of the symptoms caused by Parkinsonism and similar diseases.

13 Claims, No Drawings

COMPOSITION AND METHOD OF TREATING DOPAMINE DEFICIENCY IN BRAIN TISSUE

Matter enclosed in heavy brackets [ ] appears in the original patent but forms no part of this reissue specification; matter printed in italics indicates the additions made by reissue.

The present application is a continuation-in-part of U.S. application Ser. No. 835,730 filed June 23, 1969, now abandoned, which in turn is a continuation-in-part of U.S. Ser. No. 764,325 filed Oct. 1, 1968, now abandoned.

The present invention relates to a novel and useful composition and method of increasing the dopamine content in the brain tissue of animals. More particularly, it relates to a composition and a method of administration wherein L-dopa or its salts is administered in combination with L-α-hydrazino-α-lower alkyl-3,4-dihydroxyphenyl propionic acid or its salts [or α-hydrazino-3,4-dihydroxyphenyl propionic acid or its salts].

A dopamine deficiency has been demonstrated to occur in certain nuclei of the brain tissue in patients with Parkinson's disease. Dopamine is 3,4-dihydroxyphenylethylamine of the structure.

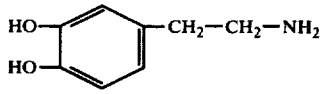

A dopamine deficiency in the corpus striatum results in increased muscular tension and akinesia which is defined as the absence or disturbance of motion in a muscle. This is characterized by the rigidity of limbs and difficulty in walking, sitting, standing, etc. noted in Parkinson syndrome.

It was first suggested that perhaps dopamine could be administered directly to the animal to compensate for the deficiency. However, a natural blood-brain barrier in the body prevented the absorption in brain tissue. It was then proposed that a metabolic precursor of dopamine be utilized with the body changing the precursor into dopamine after it has traversed the blood-brain barrier. Accordingly, racemic dopa was employed for this purpose as it was a known precursor of dopamine. Dopa is 3,4-dihydroxyphenylalanine of the formula

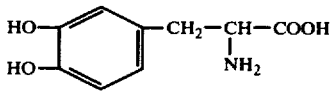

and is known to be racemic due to its asymmetric carbon atom. In employing dopa to increase the dopamine content of brain tissue, numerous side effects were encountered such as nausea and vomiting, as well as hypertension in some instances and hypotension in others. Also noted were certain changes in blood chemistry which have not been fully explained. However, the overall results ranged from poor to excellent in alleviating muscular tension and akinesia.

An effort to minimize side effects led to a separation of the dopa, which is racemic, into its D- and L-forms with subsequent testing of each. It was found that L-dopa was far more effective and resulted in less side effects than the use of D-dopa. Accordingly, L-dopa has [new] *now* been experimentally accepted as a treatment for the muscular tension and akinesia but it too produces side effects (such as nausea and vomiting) in certain patients due to the fact that it must be administered in quite high dosage levels, i.e., 4–8 grams/day. Obviously, if a combination of drugs could be found which would reduce the amount of L-dopa which was required to obtain remission of symptoms thereby lessening or eliminating side effects, it would receive widespread acceptance in the art.

It is an object of the present invention to provide a composition which increases the dopamine content in brain tissue with a lessening or omission of side effects. It is a further object to produce a combination of drugs which requires less L-dopa in increasing the dopamine content in the brain tissue of animals. Other objects will become apparent as the description of the invention proceeds.

These objects are accomplished by the present invention which provides a method of increasing the dopamine content in the brain tissue of an animal which comprises administering to the animal an effective amount of a composition containing a compound (A) selected from the group consisting of L-dopa and the pharmaceutically acceptable non-toxic salts thereof and a compound (B) selected from the group consisting of L-α-hydrazino-α-lower alkyl-3,4-dihydroxyphenyl propionic acid [and α-hydrazino-3,4-dihydroxyphenyl propionic acid] and the pharmaceutically acceptable non-toxic salts thereof, wherein the ratio of Compound (A) to Compound (B) is from about 0.05 to about 500.

In a preferred embodiment of the present invention, the composition is employed in amounts of from about 0.05 to about 300 mg./kg. of body weight, more preferably from about 0.1 to about 200 mg./kg. of body weight. In a still more preferred embodiment, the composition is utilized in amounts of from about 5 to about 150 mg./kg. of body weight. In using the composition, the ratio of Compound (A) to Compound (B) will generally be from about 0.05 to about 500, more preferably from about 0.5 to about 50 with a ratio of from about 1 to about 30 being optimum. If desired a large amount of Compound (A) may be utilized with a small amount of Compound (B). However, the side effects from Compound (A) can cause complications and it is desirable to use as little as possible while still accomplishing the desired results. The use of the hydrazine compound materially reduces the amount of L-dopa required.

The hydrazine compound, like dopa, contains an asymmetric carbon atom and exists as the L, the D or the racemate. [When utilizing α-hydrazino-α-lower alkyl-3,4-dihydroxypenyl propionic acid, only] *Only* the L-form is used since the D-form is essentially inactive and shows some signs of toxicity at elevated dosages. [However, when one employs the α-hydrazino-3,4-dihydroxyphenyl propionic acid, both the D- and L-forms of the compounds are active so that one may utilize the D, the L or the racemate.]

The present invention further provides a pharmaceutical composition comprising a Compound (A) selected from the group consisting of L-dopa and the pharmaceutically acceptable non-toxic salts thereof and a Compound (B) selected from the group consisting of L-α-hydrazino-α-lower alkyl-3,4-dihydroxyphenyl propionic acid [and α-hydrazino-3,4-dihydroxyphenyl propionic acid] and the pharmaceutically acceptable non-toxic salts thereof, wherein the ratio of Compound (A) to Compound (B) is from about 0.05 to about 500.

The compounds employed in the present invention have the structural formula

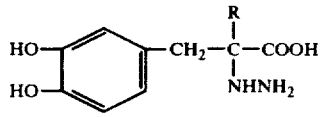

wherein R is [H or] lower alkyl. When R is lower alkyl, the compound is used in its L-form.

In a preferred embodiment of the present invention, the drugs are administered orally. However, the drug can also be administered parenterally, rectally as suppositories or topically with penetrating agents. Preferably, the drugs are administered sequentially with L-α-hydrazino-α-lower alkyl-3,4-dihydroxyphenyl propionic acid [or α-hydrazino-3,4-dihydroxyphenyl propionic acid] being given a few minutes to about 5 hours prior to the administration of L-dopa. As a practical matter, however, the drugs are generally given simultaneously in a single pill or capsule. The combination is usually given in amounts of from about 0.05 to about 300 mg./kg. of body weight with the ratio of L-dopa to the hydrazine compound being from about 0.05 to about 500 (weight basis).

In a preferred embodiment of the present invention, the hydrazine compound is L-α-hydrazino-α-methyl-3,4-dihydroxyphenyl propionic acid [or α-hydrazino-3,4-dihydroxyphenyl propionic acid].

The pharmaceutically acceptable salts of the drugs which may be used include, without limitation, the alkali metal and ammonium salts of the carboxy function and the hydrochloride, hydrobromide, sulfate and the like salts of the amine function. The term "lower alkyl" means an alkyl group containing from 1 to about 4 carbon atoms. In one of the preferred embodiments of the present invention, the free base compounds are used and not the salts.

The invention will now be described by reference to the following examples in which all parts are expressed in parts by weight unless otherwise indicated.

EXAMPLES 1 to 18

Female albino mice weighing between 18 and 22 g. each are used. L-dopa, the α-hydrazino-α-substituted-3,4-dihydroxyphenyl propionic acid and combinations of the two are administered orally, in solution or suspension in water, and the animals are decapitated 90 minutes later. Brains are removed and pooled in groups of three, three separate pools per drug treatment.

The brains are homogenized with n-butanol, 5 ml. per 0.75 g. tissue. The butanol extract is back extracted with 0.1 N hydrochloric acid, an aliquot of which is subjected to iodine oxidation for the fluorimetric determination of dopa plus dopamine (Porter, C. C., Totaro, J. A. and Barcin, A., J. Pharmac. Exp. Therap., 150, 17 (1965)).

Control groups of mice are included, and results are expressed as the ratio of total dopa plus dopamine in the brains of drug-treated mice to the total dopa plus dopamine in the brains of untreated controls. The average value for the three trials at each dosage level is given in Table I. In the table, Example 9 is a repeat run as a control for Example 8.

TABLE I

| Ex. | L-dopa dosage in mg./kg. | α-Methyl hydrazine compound dosage in mg./kg. | Ratio dopa+ dopamine/ normal dopa+ dopamine |
|---|---|---|---|
| 1 | None | None | 1.00 |
| 2 | 240 | None | 1.77 |
| 3 | 480 | None | 5.50 |
| 4 | 960 | None | 7.32 |
| 5 | 20 | 10 racemate | 1.79 |
| 6 | 40 | 20 racemate | 5.73 |
| 7 | 80 | 40 racemate | 13.50 |
| 8 | 40 | 20 L-form only | 6.7 |
| 9 | 40 | 20 racemate | 5.0 |

As shown by the table, 30 mg. of the combination drug (Example 5) is as effective as 240 mg. of L-dopa by itself (Example 2). Similarly, 60 mg. of the combination drug (Example 6) is as effective as 480 mg. of L-dopa by itself (Example 3). Also as shown by the table, 120 mg. of the combination drug (Example 7) is much more effective than 960 mg. of L-dopa by itself (Example 4). The table also shows the L-form of the hydrazine compound (Example 8) to be more active than the racemate (Example 9).

In order to determine the optimum ratio of L-dopa to the hydrazine compound to be utilized in the compositions, the testing procedure given above is carried out using a constant dosage of 60 mg./kg. of body weight. Only the ratio of the two drugs is changed. The results are given in Table II.

The α-methyl hydrazine compound is used in the examples.

TABLE II

| Ex. | Ratio L-dopa/ hydrazine compound | Ratio dopa+ dopamine/ normal dopa+ dopamine |
|---|---|---|
| 10 | 8 racemate | 2.54 |
| 11 | 6 racemate | 2.99 |
| 12 | 4 racemate | 3.53 |
| 13 | 2 racemate | 4.29 |
| 14 | 1 racemate | 3.61 |
| 15 | 0.5 racemate | 2.90 |
| 16 | 0.25 racemate | 2.28 |
| 17 | 0.17 racemate | 1.86 |
| 18 | 0.13 racemate | 1.51 |

As shown by the table, the most effective dosage is obtained when the ratio of the L-dopa to the racemic hydrazine compound is from about 0.2 to about 8 with a preferred ratio being from about 0.5 to about 6. In actuality the optimum ratio of about 2 would be used.

Subsequent tests have shown that the L-α-methylhydrazino compound has essentially all the activity and thus it is preferred to use only the L compound rather than the racemate. The above ratios are adjusted accordingly.

[EXAMPLES 19 and 20]

[The procedures of Examples 13 and 15 above are repeated employing α-hydrazino-3,4-dihydroxyphenyl propionic acid in place of the α-methyl hydrazino compound. The results show the desmethyl compound to be from 2 to 3½ times as active as the racemic α-methyl compound.]

[Subsequent tests show that both the D and L isomer of the hydrazine compound are substantially equal in activity. Thus, the D, the L or the racemate of this compound may be used.]

[EXAMPLE 21]

[In order to again test the effectiveness of L-dopa in combination with the α-methyl hydrazine compound (as compared to L-dopa alone) the method of Anden and coworkers is employed (Anden, N., Dalhstrom, A., Fuxe, K., and Larssen, K. "Acta Pharmacol. et Toxicol," vol. 24, pp. 263–274 (1966)). L-dopa (500 mg./kg.) administered intraperitoneally to rats with appropriate unilateral brain lesions causes the rats to circle in the direction of the lesion showing effectiveness of the drug. This effect is believed to result from the L-dopa being converted by the body into dopamine which acts upon the corpus striatum of the intact side of the rat. The beneficial effect of L-dopa in Parkinsonian patients is also believed to result from the action of dopamine upon the corpus striatum. Lower doses of L-dopa (150 mg./kg., intraperitoneally) is ineffective. However, after one hour pretreatment with racemic α-hydrazino-α-methyl-3,4-dihydroxyphenyl propionic acid (50 mg./kg., intraperitoneally), a dose of 150 mg./kg. of L-dopa is now sufficient to again cause circling movements in lesioned rats.]

While in the above examples only the combination of the two compounds is shown, it should be noted that the compounds would generally be utilized with other drugs such as tranquillizers, anti-cholinergic agents, muscle relaxants, anti-histamines and the like to alleviate other symptoms of Parkinsonism and like diseases.

Many other equivalent modifications of the invention would be apparent to those skilled in the art from a reading of the foregoing without a departure from the inventive concept.

What is claimed is:

1. A method of increasing the dopamine content in the brain tissue of an animal which comprises administering to the animal an effective amount of a composition containing a Compound (A) selected from the group consisting of L-dopa and a pharmaceutically acceptable non-toxic salt thereof and a Compound (B) selected from the group consisting of *L*-α-hydrazino-α-lower alkyl-3,4-dihydroxyphenyl propionic acid [and α-hydrazino-3,4-dihydroxyphenyl propionic acid] and a pharmaceutically acceptable non-toxic salt thereof, wherein the ratio of Compound (A) to Compound (B) is from about 0.05 to about 500.

2. The method of claim 1 wherein the Compound (B) is L-α-hydrazino-α-methyl-3,4-dihydroxyphenyl propionic acid.

[3. The method of claim 1 wherein the Compound (B) is α-hydrazino-3,4-dihydroxyphenyl propionic acid.]

4. A method of increasing the dopamine content in the bran tissue of an animal which comprises administering to the animal from about 0.05 to about 300 mg./kg. of body weight of a composition containing a Compound (A) selected from the group consisting of L-dopa and a pharmaceutically acceptable non-toxic salt thereof and a Compound (B) selected from the group consisting of L-α-hydrazino-α-lower alkyl-3,4-dihydroxyphenyl propionic acid [and α-hydrazino-3,4-dihydroxyphenyl propionic acid] and a pharmaceutically acceptable non-toxic salt thereof, wherein the ratio of Compound (A) to Compound (B) is from about 0.05 to about 500.

5. The method of claim 4 wherein the Compound (B) is L-α-hydrazino-α-methyl-3,4-dihydroxyphenyl propionic acid.

[6. The method of claim 4 wherein the Compound (B) is α-hydrazino-3,4-dihydroxyphenyl propionic acid.]

7. The method of claim 4 wherein the compounds are administered orally.

8. The method of claim 4 wherein the compounds are administered sequentially.

9. The method of claim 4 wherein the compounds are administered simultaneously.

10. The method of claim 4 wherein the ratio of Compound (A) to Compound (B) is from about 0.5 to about 50.

11. The method of claim 4 wherein the ratio of Compound (A) to Compound (B) is from about 1 to about 30.

12. A pharmaceutical composition comprising a Compound (A) selected from the group consisting of L-dopa and a pharmaceutically acceptable non-toxic salt thereof and a Compound (B) selected from the group consisting of L-α-hydrazino-α-lower alkyl-3,4-dihydroxyphenyl propionic acid [and α-hydrazino-3,4-dihydroxyphenyl propionic acid] and a pharmaceutically acceptable non-toxic salt thereof, wherein the ratio of Compound (A) to Compound (B) is from about 0.05 to about 500.

13. The pharmaceutical composition of claim 12 wherein the ratio of Compound (A) to Compound (B) is from about 0.5 to about 50.

14. The pharmaceutical composition of claim 12 wherein the ratio of Compound (A) to Compound (B) is from about 1 to about 30.

*15. The pharmaceutical composition of claim 12 wherein the Compound (B) is L-α-hydrazino-α-methyl-3,4-dihydroxyphenyl propionic acid.*

* * * * *

UNITED STATES PATENT OFFICE

CERTIFICATE OF CORRECTION

Patent No. Reissue 29,892 Dated January 30, 1979

Inventor(s) GILBERT M. BAYNE

It is certified that error appears in the above-identified patent and that said Letters Patent are hereby corrected as shown below:

Column 6, line 5, "bran" should read --brain--.

Signed and Sealed this

*Twenty-seventh* Day of *November 1979*

[SEAL]

*Attest:*

RUTH C. MASON
*Attesting Officer*

LUTRELLE F. PARKER
*Acting Commissioner of Patents and Trademarks*